US008305495B2

(12) United States Patent  
Kegasawa (10) Patent No.: US 8,305,495 B2
(45) Date of Patent: Nov. 6, 2012

(54) VIDEO PROCESSING DEVICE, VIDEO DISPLAY DEVICE, AND VIDEO PROCESSING METHOD

(75) Inventor: Kazuyoshi Kegasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 333 days.

(21) Appl. No.: 12/748,671

(22) Filed: Mar. 29, 2010

(65) Prior Publication Data

US 2010/0253849 A1  Oct. 7, 2010

(30) Foreign Application Priority Data

Apr. 2, 2009  (JP) ................................. 2009-090094

(51) Int. Cl.
*H04N 5/14* (2006.01)
*H04N 9/64* (2006.01)
(52) U.S. Cl. ........................................ 348/571; 348/575
(58) Field of Classification Search .................. 348/571, 348/552, 553, 420.1, 584; 375/240.1, 240.24; 382/173
See application file for complete search history.

(56) References Cited

U.S. PATENT DOCUMENTS

| 4,668,985 A | * | 5/1987 | Kurashige et al. | 348/721 |
| 2006/0218376 A1 | * | 9/2006 | Pechanek | 712/11 |
| 2008/0240237 A1 | * | 10/2008 | Tian et al. | 375/240.03 |

FOREIGN PATENT DOCUMENTS

JP  A-10-304184  11/1998
* cited by examiner

*Primary Examiner* — Michael Lee
(74) *Attorney, Agent, or Firm* — Oliff & Berridge, PLC (57) ABSTRACT

A video processing device that divides and processes video data representing a video for one screen includes: an input unit that receives input of the video data; plural image processing units that are provided to correspond to respective plural areas obtained by dividing the video data, receive image data corresponding to the areas, and apply predetermined image processing to image data; an image-data extending unit that acquires image data, which is required by the image processing unit that processes an area adjacent to each of the areas, prior to the image processing by each of the image processing units from the image data corresponding to the area received by each of the image processing units, inputs the image data to the adjacent image processing unit, extends the image data corresponding to the area received by each of the image processing units, and sets the image data as a target of the predetermined image processing by each of the image processing units; and an image combining unit that receives the image data processed by the plural image processing units and reconfigures the screen.

8 Claims, 10 Drawing Sheets

VIDEO PROCESSING DEVICE, VIDEO DISPLAY DEVICE, AND VIDEO PROCESSING METHOD

BACKGROUND

1. Technical Field

The present invention relates to a technique for image processing.

2. Related Art

In recent years, among video display apparatuses such as a liquid crystal television, a plasma television, and a projector, there is known a video display apparatus with specifications of high resolution far surpassing high-definition television. In such a video display apparatus that displays a high-resolution video, a system for dividing the entire screen of a video into plural areas and processing the areas with plural processors in parallel is frequently adopted. In the system in the related art, the processors independently perform video processing for video data that the processors handle, respectively. However, in such a system, in the case of processing for applying arithmetic operation referring to data of peripheral pixels of pixels as in filter processing, in some portions of pixels at ends of the divided screens, there is no peripheral pixel data. Therefore, there is inconvenience that the entire screen cannot be completely subjected to the filter processing. As a method of solving such inconvenience, JP-A-10-304184 (Patent Document 1) is known.

In an image processing device disclosed in Patent Document 1, image data is read out from an image storing unit in which the entire area of an image is stored. A dividing and input unit divides the image into plural areas. Plural pipeline processing units process the divided areas in parallel. When the pipeline processing units need to refer to peripheral pixels, the dividing and input unit divides necessary peripheral pixels such that the divided areas overlap and inputs the peripheral pixels to the pipeline processing units.

However, in the method disclosed in Patent Document 1, it is not assumed that multistage filter processing is performed. If it is attempted to perform the multistage filter processing, work for reading out data from the image storing unit, applying the filter processing in the pipeline processing units, and then storing the data in the image storing unit again is repeated many times. Therefore, an amount of access to the image storing unit and a processing amount of the pipeline processing units increase.

SUMMARY

An advantage of some aspects of the invention is to solve at least a part of the problems described above and the invention can adopt forms or application examples explained below.

APPLICATION EXAMPLE 1

Application example 1 of the invention is directed to a video processing device that divides and processes video data representing a video for one screen, the video processing device including: an input unit that receives input of the video data; plural image processing units that are provided to correspond to respective plural areas obtained by dividing the video data, receive image data corresponding to the areas, and apply predetermined image processing to image data; an image-data extending unit that acquires image data, which is required by the image processing unit that processes an area adjacent to each of the areas, prior to the image processing by each of the image processing units from the image data corresponding to the area received by each of the image processing units, inputs the image data to the adjacent image processing unit, extends the image data corresponding to the area received by each of the image processing units, and sets the image data as a target of the predetermined image processing by each of the image processing units; and an image combining unit that receives the image data processed by the plural image processing units and reconfigures the screen.

With the video processing device, each of the image processing units receives the image data required by the image processing unit from the other image processing units prior to the image processing, receives the divided video data separately from the image data, extends the image data corresponding to the respective areas from the two data, and applies the image processing to the image data. Therefore, each of the image processing units does not need to acquire the extended image data necessary for the image processing from the input video data at a time.

APPLICATION EXAMPLE 2

Application example 2 of the invention is directed to the video processing device described in the application example 1, further including an image dividing unit that divides the input video data for each of the plural areas and outputs the video data as image data for each of the areas, wherein the image processing units are provided to correspond to each of the divided plural areas, receives the image data corresponding to the area and apply the predetermined image processing to the image data.

With the video processing device, since the video processing device includes the image dividing unit, as input of data to the image processing unit, data input of the video data forming the one screen is possible. It is possible to divide the video data for the one screen in the video processing device and process the video data as divided image data.

APPLICATION EXAMPLE 3

Application example 3 of the invention is directed to the video processing device described in the application example 1 or the application example 2, wherein the image-data extending unit is provided for each of the image processing units.

With the video processing device, since the image-data extending unit is provided for each of the image processing units, it is possible to perform extension of image data and image processing in parallel for each of the image processing units.

APPLICATION EXAMPLE 4

Application example 4 of the invention is directed to the video processing device described in any one of the application example 1 to the application example 3, wherein the image processing unit includes a filter processing unit that performs filter processing targeting a predetermined number of pixels, and the image-data extending unit acquires image data necessary for the filter processing from another image processing unit that processes the area adjacent to the area processed by the image processing unit.

With the video processing device, since the image processing unit includes the filter processing unit, it is possible to apply, in each of the image processing units, the filter processing to image data obtained by dividing one screen. In other words, it is possible to apply the filter processing to the divided image data in parallel in each of the image processing units.

APPLICATION EXAMPLE 5

Application example 5 of the invention is directed to the video processing device described in the application example 4, wherein the image processing unit includes a plurality of the filter processing units arrayed in series such that the filter processing is performed in order, and each of the filter processing units includes a data deleting unit that outputs, to the filter processing unit in the next stage arrayed in series, image data after the filter processing by each of the filter processing unit and from which image data in a peripheral area, to which the filter processing cannot be applied, is deleted.

With the video processing device, since the image processing unit includes the filter processing units arrayed in series and each of the filter processing units includes the data deleting unit, it is possible to reduce a data volume of image data output to the filter processing unit in the next stage and improve data transfer speed. Since each of the filter processing units applies the filter processing to image data after data deletion by the data deleting unit of the filter processing unit in the pre-stage, it is possible to improve processing speed.

APPLICATION EXAMPLE 6

Application example 6 of the invention is directed to the video processing device described in the application example 5, wherein the image-data extending unit acquires, from the other image processing unit, image data in an area corresponding to a sum of image data deleted according to the filter processing performed by the plural filter processing units.

With the video processing device, since each of the image processing units deletes, according to the filter processing, all the image data acquired from the other image processing units, it is possible to minimize a data volume of image data output by each of the image processing units after the processing.

APPLICATION EXAMPLE 7

Application example 7 of the invention is directed to the video processing device described in the application example 2, wherein the image dividing unit divides the video data into image data corresponding to M×N (M and N are positive integers and at least one of M and N is equal to or larger than 2) areas.

With the video processing device, since a video for one screen is divided into image data corresponding to M×N areas and the image processing is applied to the image data, it is possible to perform the image processing in various forms of division.

APPLICATION EXAMPLE 8

Application example 8 of the invention is directed to a video processing device including: the video processing device according to application example 1, and a video display unit displays the video based on the video data processed by the video processing device.

With the video display device, the video display unit can display high-resolution video based on the video data processed by the video processing device.

APPLICATION EXAMPLE 9

Application example 9 of the invention is directed to a video processing method for processing a video for one screen using plural image processing units that divide the video and apply predetermined image processing to the video, the video processing method including: receiving input of data of the video; dividing the input video data for each of the plural areas and outputting the video data as image data for each of the areas; acquiring image data, which is required by the image processing unit that processes an area adjacent to each of the areas, prior to the image processing by each of the plural image processing units from the image data corresponding to the area received by each of the image processing units, inputting the image data to the adjacent image processing unit, and extending the image data corresponding to the area received by each of the image processing units; applying the predetermined image processing to the extended image data using the plural image processing units; and receiving the image data processed by the plural image processing units and reconfiguring the screen.

With the video processing method, when the input video data is divided for each of the plural areas and output to each of the image processing units as the image data for each of the areas, it is unnecessary to transfer the image data in a form of extended image data required by the image processing unit.

The invention can be realized in various forms. For example, the invention can be realized in forms of a video processing method and device, a video processing system, an integrated circuit for realizing functions of the method or the device, a computer program, and a recording medium having recorded therein the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below.

A. First Embodiment (A1) Configuration of an Image Processing Device

Figure 1:
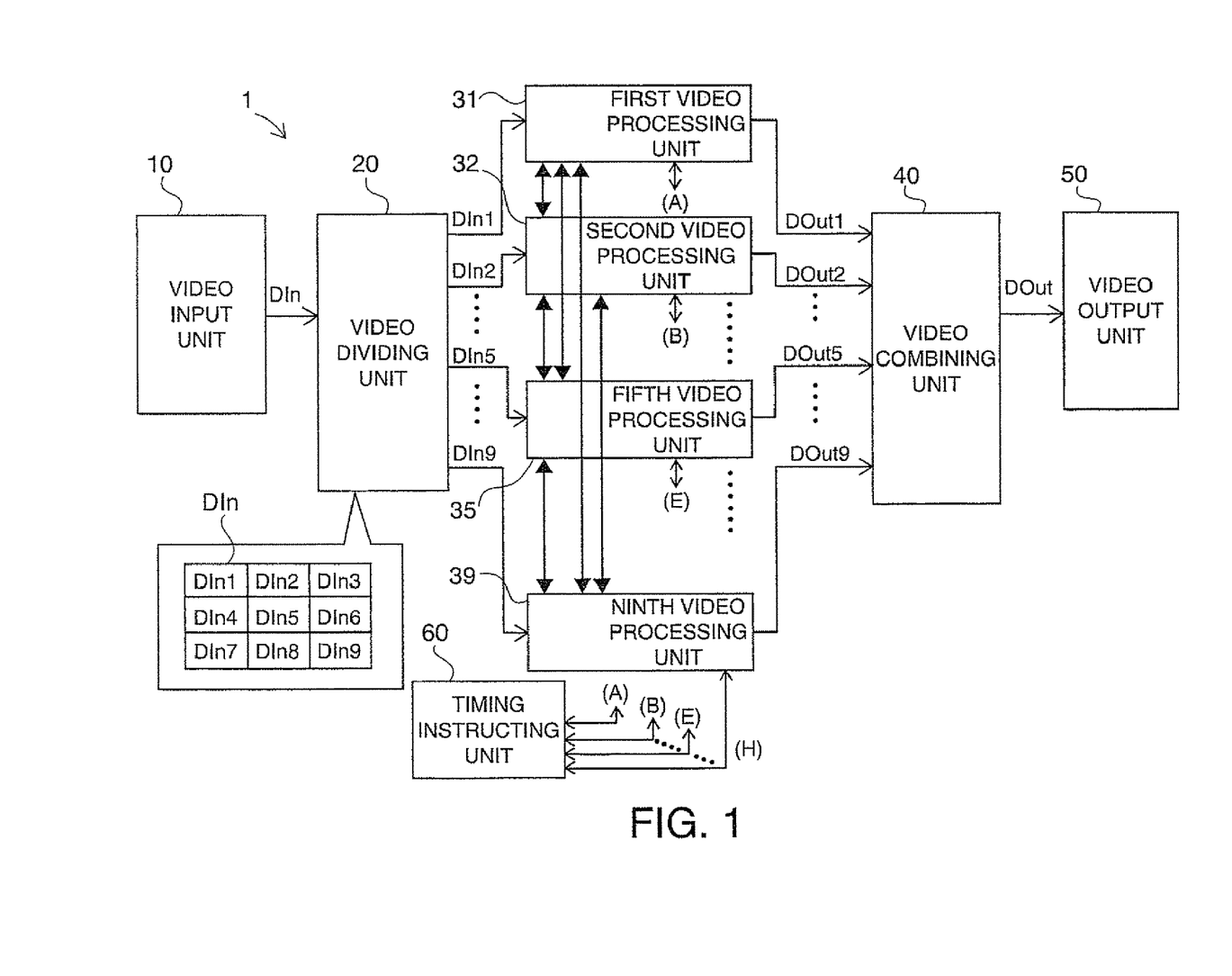
FIG. 1 is a diagram of the configuration of an image processing device according to a first embodiment of the invention.

In a first embodiment of the invention, an image processing device mounted on a liquid crystal television is explained as an example. FIG. 1 is a diagram of the configuration of an image processing device 1 according to the first embodiment mounted on a liquid crystal television. The image processing device 1 includes a video input unit 10 that converts an input analog video signal into a digital signal through A/D conversion, a video dividing unit 20 that divides digitized image data DIn into plural image blocks, first to ninth video processing units 31 to 39 as nine video processing units that process the divided image blocks in parallel, a video combining unit 40 that combines image data DOut1 to DOut9 corresponding to the image blocks processed in parallel by the video processing units (the image data corresponding to the image blocks are also simply referred to as image blocks DOut1 to DOut9) into image data of one screen, a video output unit 50 that D/A-converts combined image data DOut and then outputs the image data DOut to a video display unit of a not-shown liquid crystal television as an output signal, and a timing instructing unit 60.

The video dividing unit 20 includes a memory that stores a video signal for one frame. When image data DIn is input to the memory, the video dividing unit sequentially divides the image data DIn and outputs the image data DIn to the first to ninth video processing units 31 to 39. Rather than waiting for the video signal for one frame to be input, when the image data DIn corresponding to a dividable area is input, the video dividing unit 20 sequentially outputs image blocks DIn1, DIn2, and the like. The image data DIn is input as raster data in the horizontal direction. Therefore, for example, when the image data DIn is divided into 3×3, at a point when the first ⅓ of the video signal is input, the image blocks DIn1, DIn2, and DIn3 are output to the first to third video processing units 31 to 33. Thereafter, when another ⅓ of the video signal and still another ⅓ of the video signal are input, respectively, the image blocks DIn4 to DIn6 and the image blocks DIn7 to DIn9 are output, respectively, and received by the fourth to sixth video processing units 34 to 36 and the seventh to ninth video processing units 37 to 39. It is also possible to, without waiting for data to be accumulated by ⅓ at a time, every time image data corresponding to one line of the image blocks DIn1 to DIn9 is input to the video dividing unit 20, sequentially divide the image data and output the image data to the video processing units corresponding to image blocks.

When accumulation of image data necessary for video processing by the video processing units 31 to 39 is completed, the video processing units 31 to 39 notify the timing instructing unit 60 of the completion. The timing instructing unit 60 analyzes states of the accumulation of the image data in the video processing units 31 to 39 and instructs the processing unit, which can perform data exchange among the first to ninth video processing units 31 to 39, to start the data exchange. The instruction for the data exchange and processing for the data exchange are explained in detail later. The data exchange may be performed after all the first to ninth video processing units 31 to 39 receive the image data. However, in view of the fact that the reception of the image data is sequentially performed, the data exchange is instructed in order from the data exchange between the video processing units that can perform the data exchange. The image data DIn may be once stored in a frame memory and then divided and output to the first to ninth video processing units 31 to 39.

The timing instructing unit 60 instructs, at timing when the video combining unit 40 should combine videos and the video output unit 50 should output a video signal after the combination, the first to ninth video processing units 31 to 39 to output the video signal after the processing to the video combining unit 40. When the video combining unit 40 has a frame memory or the like for one screen, as the instruction, the timing, instructing unit 60 may cause the video processing units, which complete the video processing earlier, to sequentially output the image block DOut. The first to ninth video processing units 31 to 39 respectively perform exchange of data explained later with the video processing units around the first to ninth video processing units 31 to 39. This is because, since the first video processing unit 31 can end the exchange of the data earliest and start the video processing, usually, the image data DOut1 can be output earliest.

Plural arrows in the vertical direction shown among the nine video processing units 31 to 39 in FIG. 1 indicate a state in which the video processing units 31 to 39 exchange pixel data necessary for the processing one another according to an instruction from the timing instructing unit 60. The image data DIn for one screen is divided into three in the horizontal direction and divided into three in the vertical direction, i.e., nine blocks in total by the video dividing unit 20. The divided image blocks DIn1 to DIn9 are processed in parallel by the nine video processing units 31 to 39. The first video processing unit 31 processes the image block DIn1 and the second video processing unit 32 processes the image block DIn2. In this way, numbers of the video processing units and numbers of the image blocks correspond to each other. The respective video processing units process the respective image blocks. Only the positions of the image blocks to be processed by the nine video processing units 31 to 39 are different. Processing contents of the nine video processing units 31 to 39 are the same. The configuration of the fifth video processing unit 35 and processing by the fifth video processing unit 35 are mainly explained below.

Figure 2:
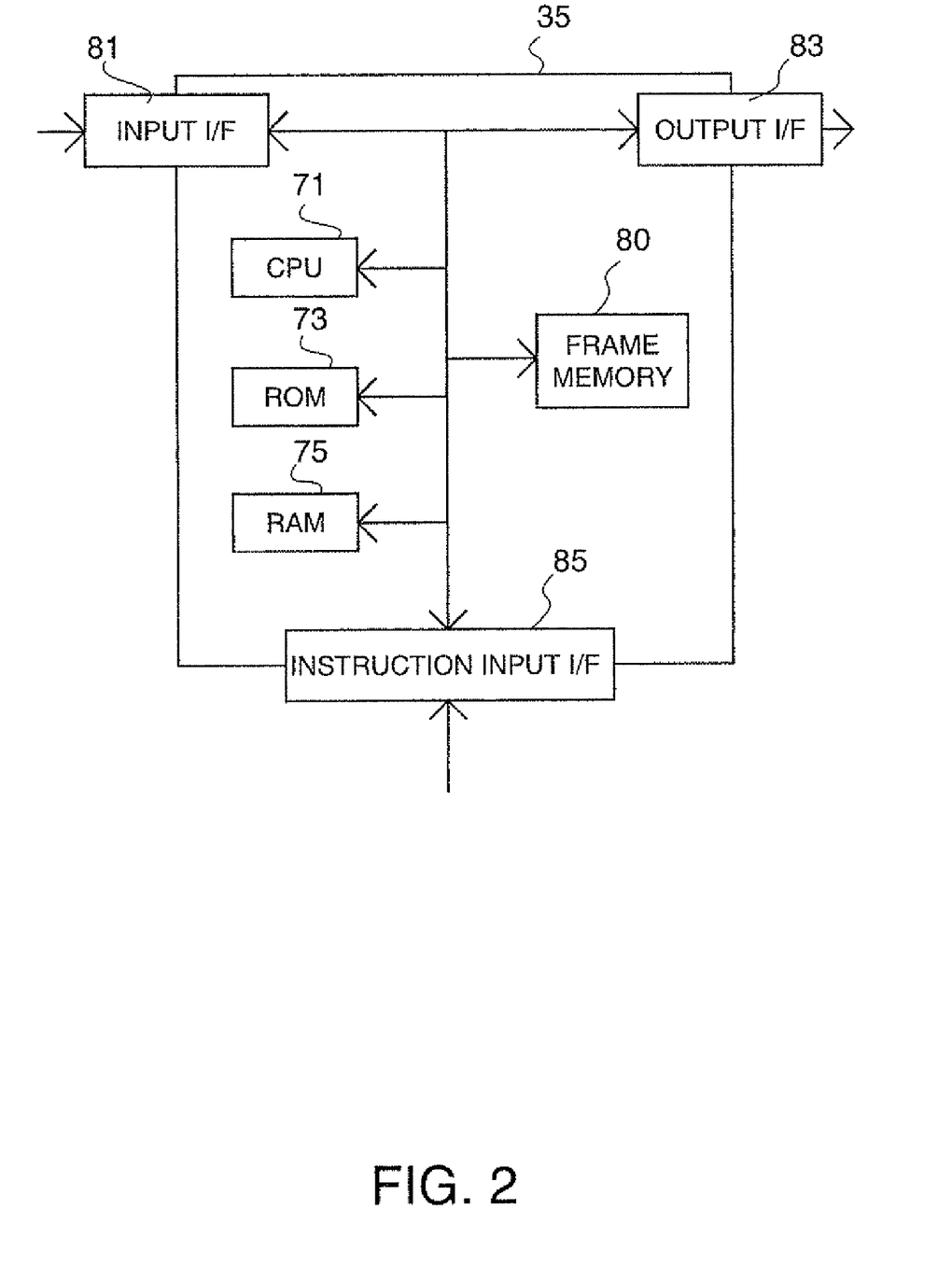
FIG. 2 is a block diagram of the internal configuration of a fifth video processing unit.

FIG. 2 is a block diagram of the internal configuration of the fifth video processing unit 35. The fifth video processing unit 35 includes a CPU 71 having a function of a digital signal processor (DSP), a ROM 73 having stored therein an operation program and the like, a RAM 75 used as a work area, a frame memory 80 having a storage capacity slightly larger than image data for a divided screen, i.e., the image block DIn, an input interface 81 that receives the image data DIn from the video dividing unit 20, an output interface 83 that outputs the image block DOut to the video combining unit 40, and an instruction input interface 85 that receives a timing signal from the timing instructing unit 60. The CPU 71 controls the operation of the entire fifth video processing unit 35. The CPU 71 is a dedicated processor that can access, in particular, the frame memory 80 at high speed and perform predetermined image processing (filter processing). Functions of the CPU 71 may be realized by using an FPGA, an LSI exclusive to video processing, and the like.

Figure 3:
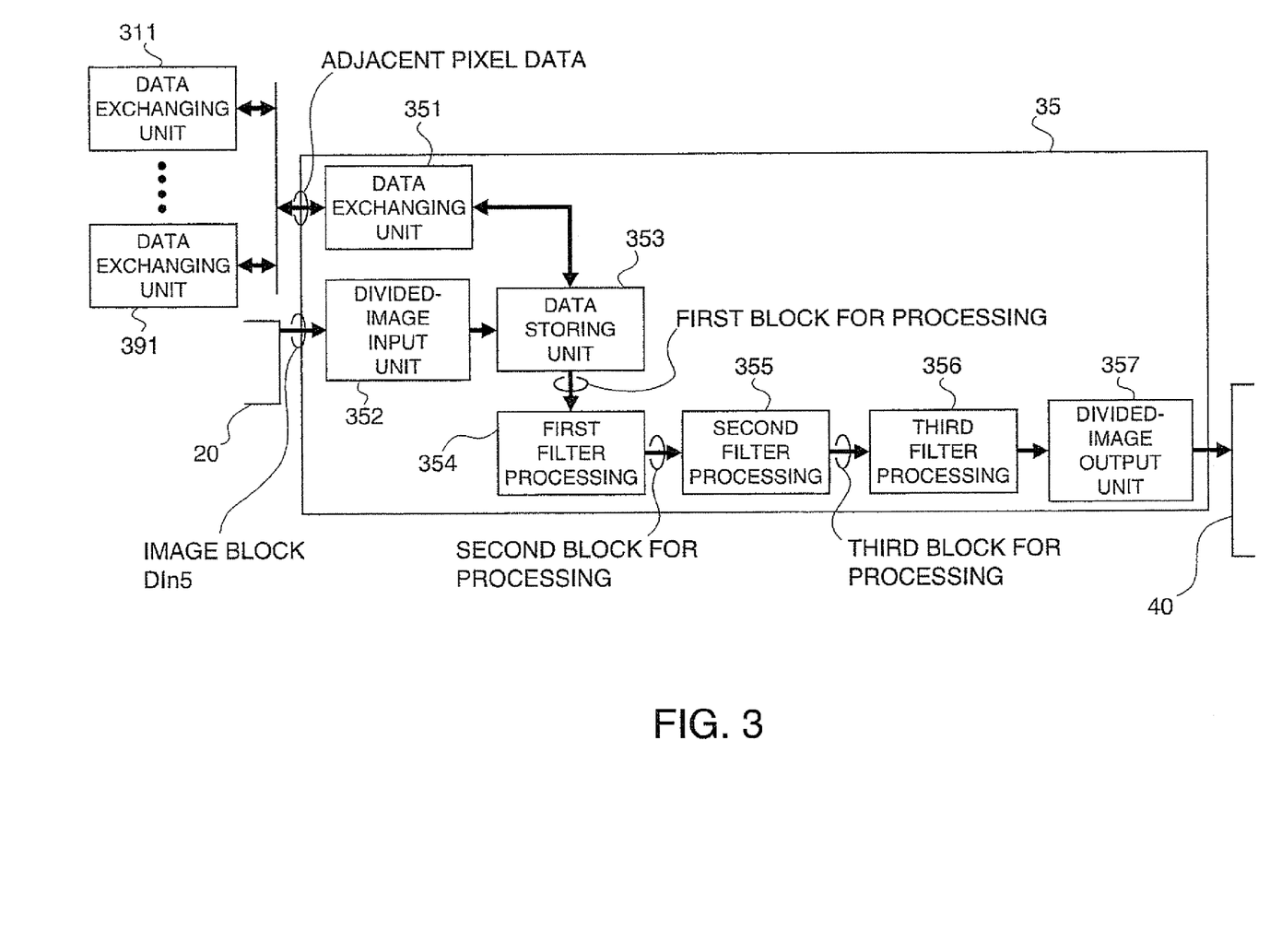
FIG. 3 is a schematic block diagram of the operation in the fifth video processing unit.

Processing by the video processing units 31 to is specifically explained. FIG. 3 is a schematic block diagram of the operation in the fifth video processing unit 35. The fifth video processing unit 35 includes, in terms of functions, a data exchanging unit 351, a divided-image input unit 352, a data storing unit 353, a first filter processing unit 354, a second filter processing unit 355, a third filter processing unit 356, and a divided-image output unit 357. The fifth video processing unit 35 performs multistage image processing in series using the first, second, and third filters 354 to 356. Actually, the operation of these blocks is realized by the CPU 71 executing a predetermined program.

The data exchanging unit 351 exchanges, with data exchanging units included in the video processing units other than the fifth video processing unit 35, pixel data necessary for image processing in the video processing units (hereinafter also referred to as adjacent pixel data). When the data exchanging unit 351 acquires, from the other data exchanging units, adjacent pixel data required for image processing by the fifth video processing unit 35, the data exchanging unit 351 outputs the adjacent pixel data to the data storing unit 353. The data storing unit 353 stores the adjacent pixel data.

The divided-image input unit 352 receives the image block DIn5 output from the video dividing unit 20 and outputs the received image block DIn5 to the data storing unit 353. The data storing unit 353 stores the input image block DIn5. The data storing unit 353 generates pixel data for image processing (hereinafter also referred to as first block for processing) from the adjacent pixel data acquired from the data exchanging unit 351 and the image block DIn5 acquired from the divided-image input unit 352. The data storing unit 353 outputs the generated first block for processing to the first filter processing unit 354. The data exchanging unit 351, the divided-image input unit 352, and the data storing unit 353 correspond to an image-data extending unit described in claims.

The first filter processing unit 354 applies first filter processing to a pixel as a target of the first filter processing (hereinafter also referred to first pixel of attention) of the first block for processing acquired from the data storing unit 353. After applying the first filter processing to the first block for processing, the first filter processing unit 354 outputs pixel data necessary for filter processing in the second filter processing unit 355 (hereinafter also referred to as second block for processing) among pixel data after the first filter processing to the second filter processing unit 355.

The second filter processing unit 355 applies second filter processing to a pixel as a target of the second filter processing (hereinafter also referred to second pixel of attention) of the second block for processing acquired from the first filter processing unit 354. After applying the second filter processing to the second block for processing, the second filter processing unit 355 outputs pixel data necessary for filter processing in the third filter processing unit 356 (hereinafter also referred to as third block for processing) among pixel data after the second filter processing to the third filter processing unit 356.

The third filter processing unit 356 applies third filter processing to a pixel as a target of the third filter processing (hereinafter also referred to as third pixel of attention) of the third block for processing acquired from the second filter processing unit 355. After applying the third filter processing to the third block for processing, the third filter processing unit 356 outputs the image block DOut5 in the pixel data after the third filter processing to the divided-image output unit 357. When the divided-image output unit 357 acquires the image block DOut5, the divided-image output unit 357 outputs the image block DOut5 to the video combining unit 40. As explained above, the image block DOut5 is one of the nine image blocks DOut1 to DOut9 required by the video combining unit 40 to combine image data into image data of one screen.

(A2) Video Processing

Figure 4:
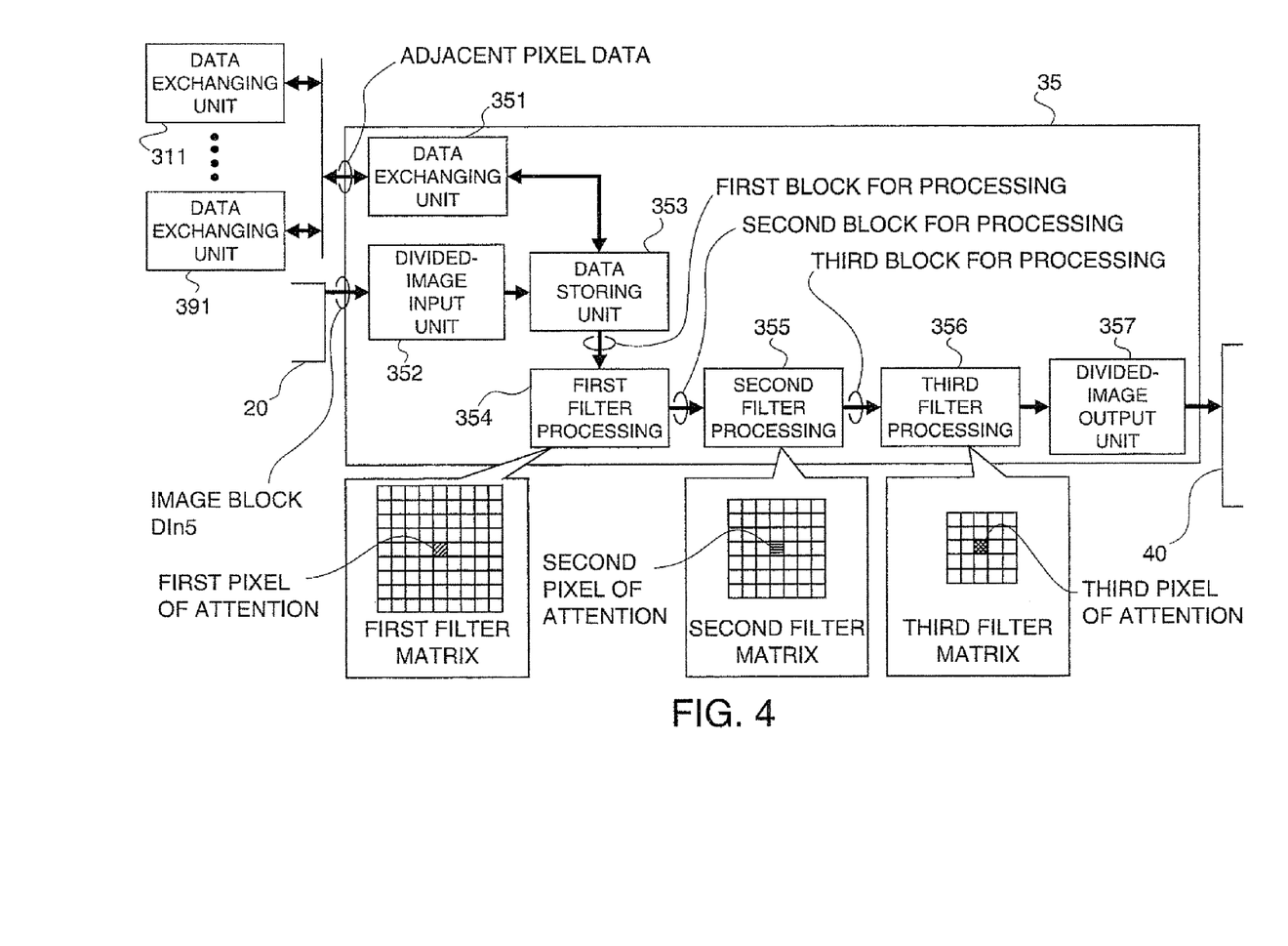
FIG. 4 is a diagram for explaining first, second, and third filter matrixes.

Details of the video processing performed in the fifth video processing unit 35 are explained below. FIG. 4 is a diagram for explaining first, second, and third filter matrixes used for the filter processing applied to the first, second, and third blocks for processing by the first, second, and third filter processing units 354 to 356, respectively. The first filter matrix is a filter matrix including 9 pixels×9 pixels. A hatched pixel located in the center of the first filter matrix is a first pixel of attention processed by the first filter matrix. The first filter processing unit 354 refers to pixel data around the first pixel of attention in the first filter matrix (also referred to as first reference pixels) in order to apply the filter processing to the first pixel of attention.

The second filter matrix is a filter matrix including 7 pixels×7 pixels. A hatched pixel located in the center of the second filter matrix is a second pixel of attention processed by the second filter matrix. The second filter processing unit 355 refers to pixel data around the second pixel of attention in the second filter matrix (also referred to as second reference pixels) in order to apply the filter processing to the second pixel of attention.

The third filter matrix is a filter matrix including 5 pixels×5 pixels. A hatched pixel located in the center of the third filter matrix is a third pixel of attention processed by the third filter matrix. The third filter processing unit 356 refers to pixel data around the third pixel of attention in the third filter matrix (also referred to as third reference pixels) in order to apply the filter processing to the third pixel of attention. In other words, the first filter processing unit 354 applies the processing to the first block for processing using the first filter matrix, the second filter processing unit 355 applies the processing to the second block for processing using the second filter matrix, and the third filter processing unit 356 applies the processing to the third block for processing using the third filter matrix.

Figure 5:
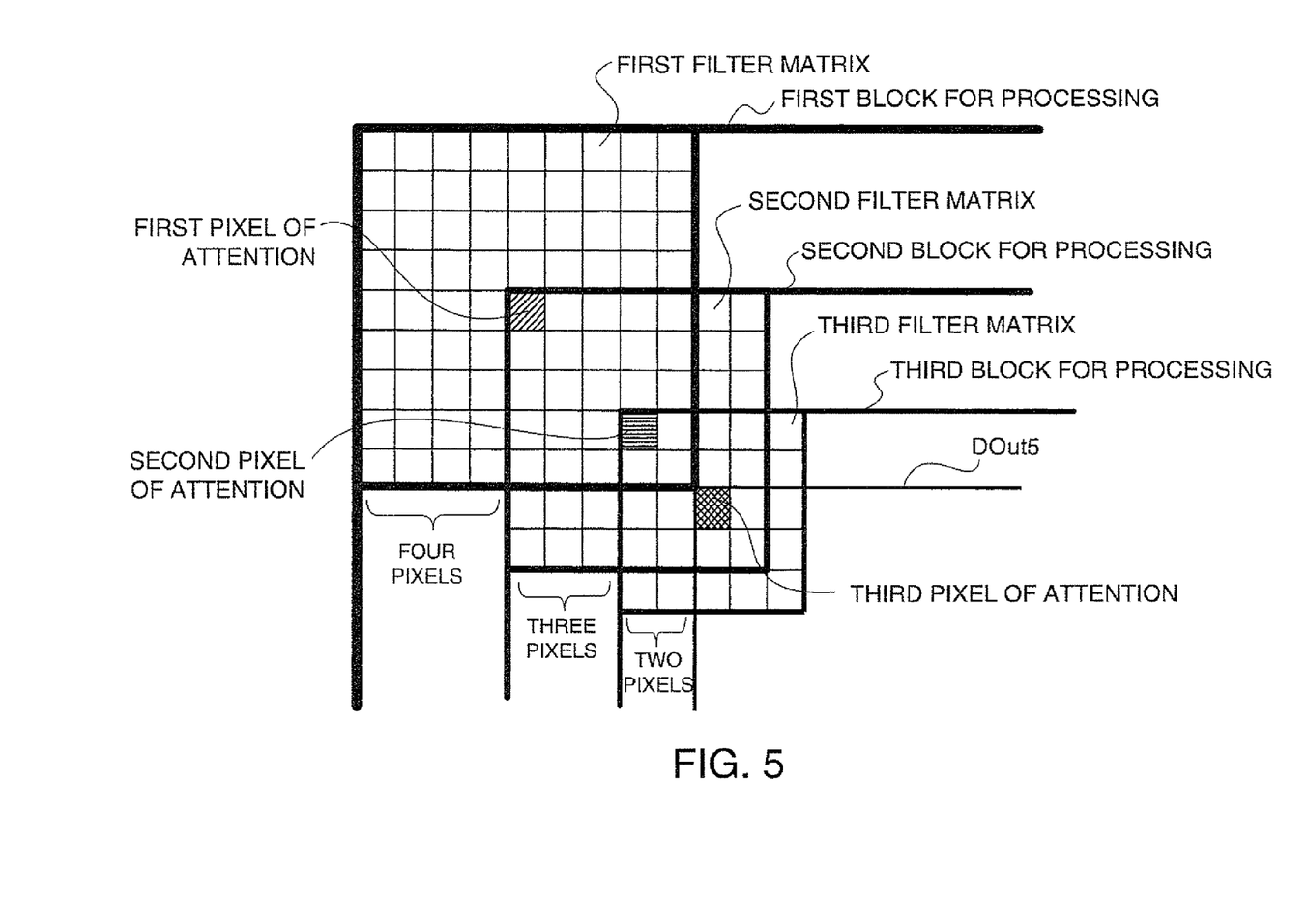
FIG. 5 is a diagram for explaining blocks of an image necessary in each filter processing.

Pixels necessary as the first, second, and third blocks for processing are explained below. For convenience of explanation, the kind of processing performed by the filter processing units are considered in opposite order, i.e., in order of the third filter processing, the second filter processing, and the first filter processing. FIG. 5 is a diagram for explaining blocks of images necessary in these kinds of filter processing. In FIG. 5, DOut5 indicates pixel data output to the video combining unit 40 (FIG. 1). The pixel data DOut5 is combined with the other image blocks by the video combining unit 40 and displayed as a video via the video output unit 50. Therefore, the third filter processing needs to be applied to all pixels. In order to apply the third filter processing to all the pixels of the pixel data DOut5 in the third filter processing unit 356, it is necessary to also apply the filter processing to a pixel at an end of the DOut5 as the third pixel of attention in the third filter matrix. Therefore, in addition to the pixels of the pixel data DOut5, pixel data is necessary as reference pixels larger in number by the number of third reference pixels in the third filter matrix. In other words, the third block for processing has to be pixel data obtained by adding two third reference pixels with respect to each of the pixels around the pixel data DOut5.

The third block for processing is pixel data subjected to the filter processing in the second filter processing unit 355 and output. In other words, the second filter processing needs to be applied to all pixels of the third block for processing. In order to apply the second filter processing to all the pixels of the third block for processing in the second filter processing unit 355, it is necessary to also apply the filter processing to a pixel at an end of the third block for processing as the second pixel of attention in the second filter matrix. Therefore, in addition to the pixels of the third block for processing, pixel data larger in number by the number of second reference pixels in the second filter matrix is necessary. In other words, the second block for processing is pixel data obtained by adding three second reference pixels with respect to each of the pixels around the third block for processing.

Similarly, the first block for processing has to be pixel data obtained by adding four first reference pixels around each of the pixels of the second block for processing. As explained above, the image block DOut5 is an image obtained by applying the filter processing to the image block DIn5 input to the fifth video processing unit 35. Therefore, DIn5 and DOut5 are in a correspondence relation. Therefore, the first block for processing can be understood as pixel data obtained by adding the first, second, and third reference pixels, i.e., nine peripheral pixels (four pixels+three pixels+two pixels) with respect to each of the pixels around the image block DIn5.

As explained above, the first block for processing is the pixel data generated by the data storing unit 353 (FIG. 3). The first block for processing is generated from the adjacent pixel data acquired from the data exchanging unit 351 and the image block DIn5 acquired from the divided-image input unit 352. In order to generate the first block for processing from the image block DIn5 and the adjacent pixel data, the data exchanging unit 351 acquires, as the adjacent pixel data, adjacent pixel data from the image blocks DIn1 to DIn4 and DIn6 to DIn9 located adjacent to the image block DIn5 in the image data DIn.

Figure 6:
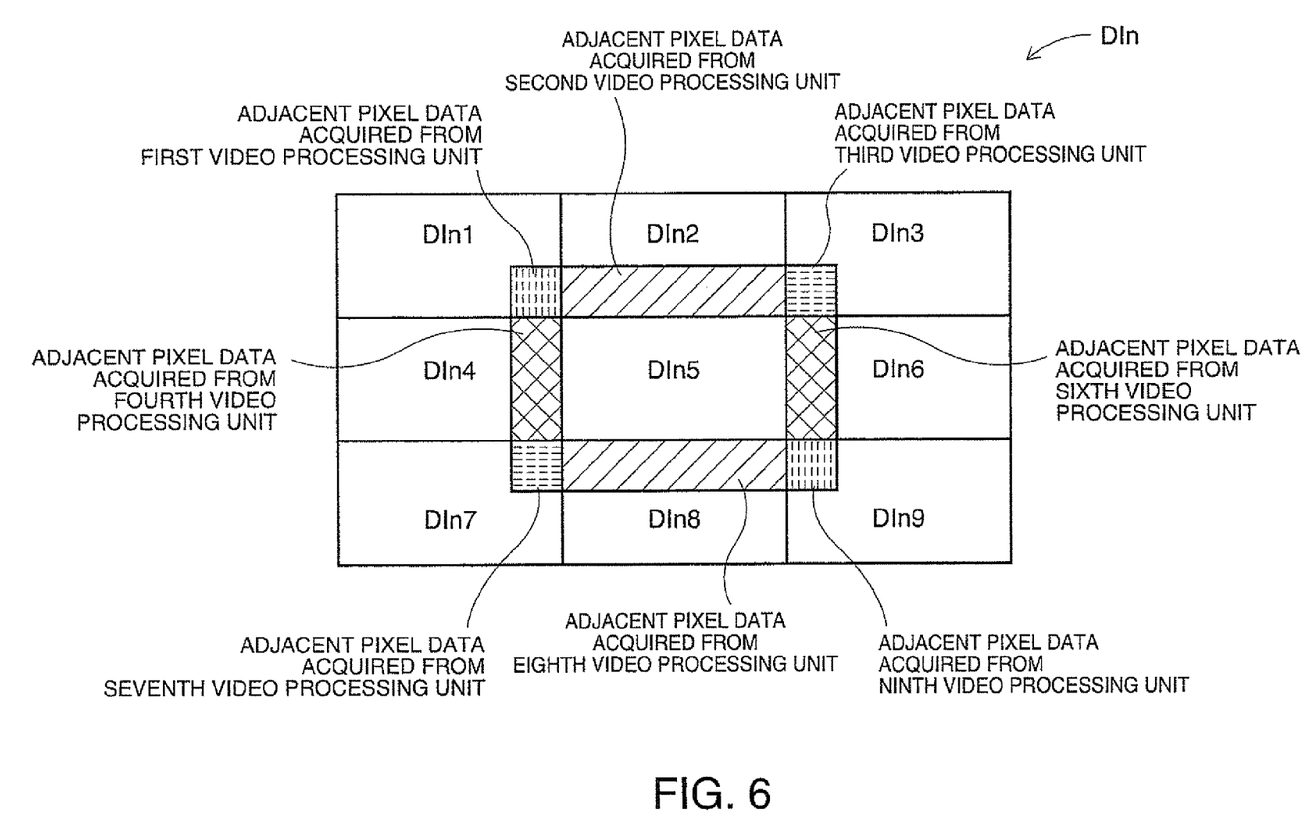
FIG. 6 is a diagram for explaining adjacent pixel data acquired by a data exchanging unit.

FIG. 6 is a diagram for explaining adjacent pixel data acquired from the peripheral image blocks by the data exchanging unit 351 (FIG. 3). As shown in FIG. 6, the data exchanging unit 351 acquires nine pixels around each of the pixels of the image block DIn5 from the image blocks DIn1 to DIn4 and DIn6 to DIn9 adjacent thereto. Specifically, the data exchanging unit 351 acquires the pixels from the data exchanging units of the video processing units that respectively acquire the image blocks DIn1 to DIn4 and DIn6 to DIn9. The timing instructing unit 60 transmits an instruction for data exchange to the data exchanging units of the video processing units. When the other data exchanging units receive the data exchange instruction from the timing instructing unit 60, the other data exchanging units transmit adjacent pixel data required by the fifth video processing unit 35 to the data exchanging unit 351. Conversely, when the other video processing units request a part of the pixel data of the image block DIn5 as adjacent pixel data necessary for processing, the timing instructing unit 60 transmits an instruction for transmission of the adjacent pixel data requested by the other image processing units to the data exchanging unit 351 of the fifth video processing unit 35. The data exchanging unit 351 transmits, as the adjacent pixel data, pixel data requested by the data exchanging units of the other image processing units among the data of the image block DIn5. The pixel data required for the first, second, and third blocks for processing and the pixel data acquired by the data exchanging unit 351 from the data exchanging units of the other video processing units as the adjacent pixel data are explained above.

Figure 7:
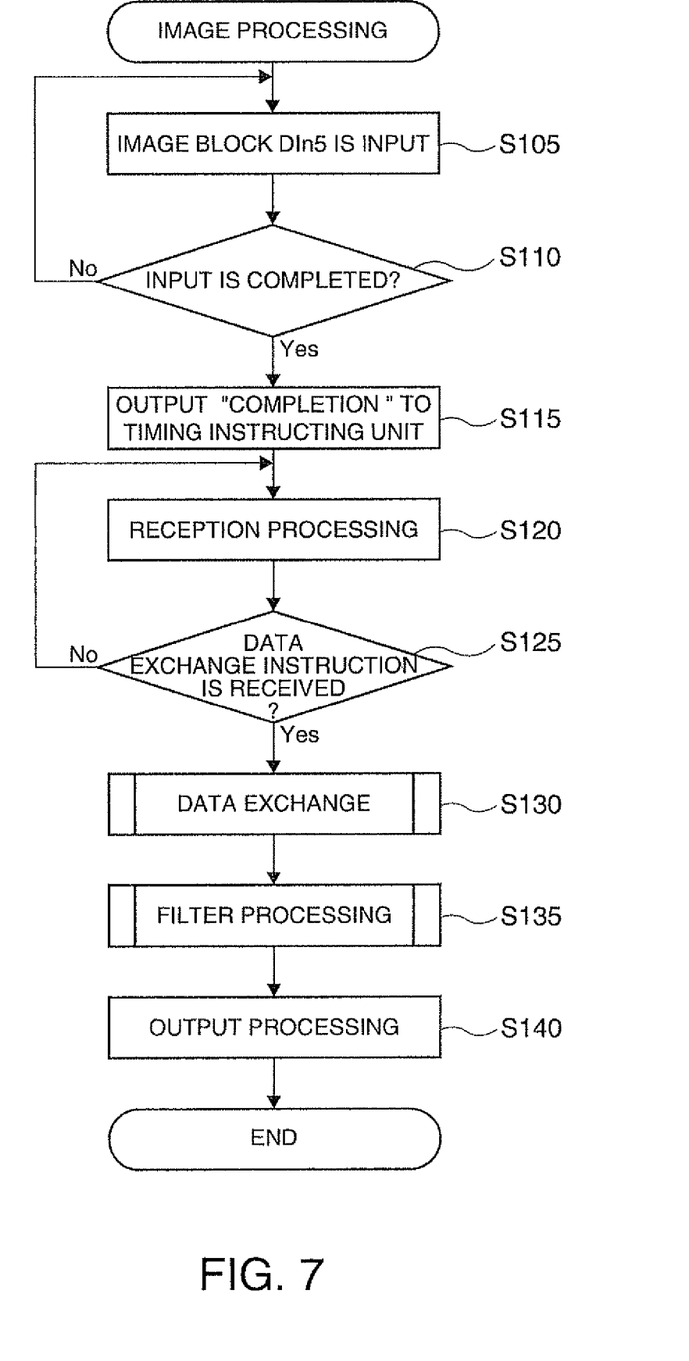
FIG. 7 is a flowchart for explaining a process of image processing performed by the fifth video processing unit.

Processing from processing of the image block DIn5 input to the fifth video processing unit 35 by the filter processing units to output of the image block DIn5 as the image block DOut5 from the divided-image output unit 357 is explained in order below. FIG. 7 is a flowchart of a process of image processing performed by the CPU 71 of the fifth video processing unit 35. The processing is started simultaneously with the input of video data to the image processing device 1. When execution of the processing is started, the image block DIn5 is input to the fifth video processing unit 35 from the video dividing unit 20 (step S105). When the input of the image block DIn5 is completed (step S110), the CPU outputs a "completion" signal, which indicates that the input of the image block DIn5 is completed, to the timing instructing unit 60 (step S115). After transmitting the "completion" signal to the timing instructing unit 60, the CPU 71 sets the fifth video processing unit 35 in a state in which the fifth video processing unit 35 can receive an instruction for "data exchange" from the timing instructing unit 60 (step S120). When the timing instructing unit 60 receives the "completion" signal from another video processing unit in addition to the reception of the "completion" signal from the fifth video processing unit 35, the timing instructing unit 60 specifies a video processing unit with which the fifth video processing unit 35 can exchange data. The timing instructing unit 60 transmits an instruction for "data exchange" to the fifth video processing unit 35 to perform data exchange with the video processing unit. When the fifth video processing unit 35 receives the instruction of "data exchange" (step S125), the data exchanging unit 351 performs the data exchange (exchange of adjacent pixel data) with the data exchanging unit of the other video processing unit as explained above with reference to FIG. 6 (step S130). After the data exchange ends, the fifth video processing unit 35 performs the filter processing on the basis of adjacent data acquired by the data exchange and the image block DIn5 (step S135). The fifth video processing unit 35 outputs the image block DOut5 generated by the filter processing to the video combining unit 40. In this way, the fifth video processing unit 35 ends the filter processing.

Figure 8:
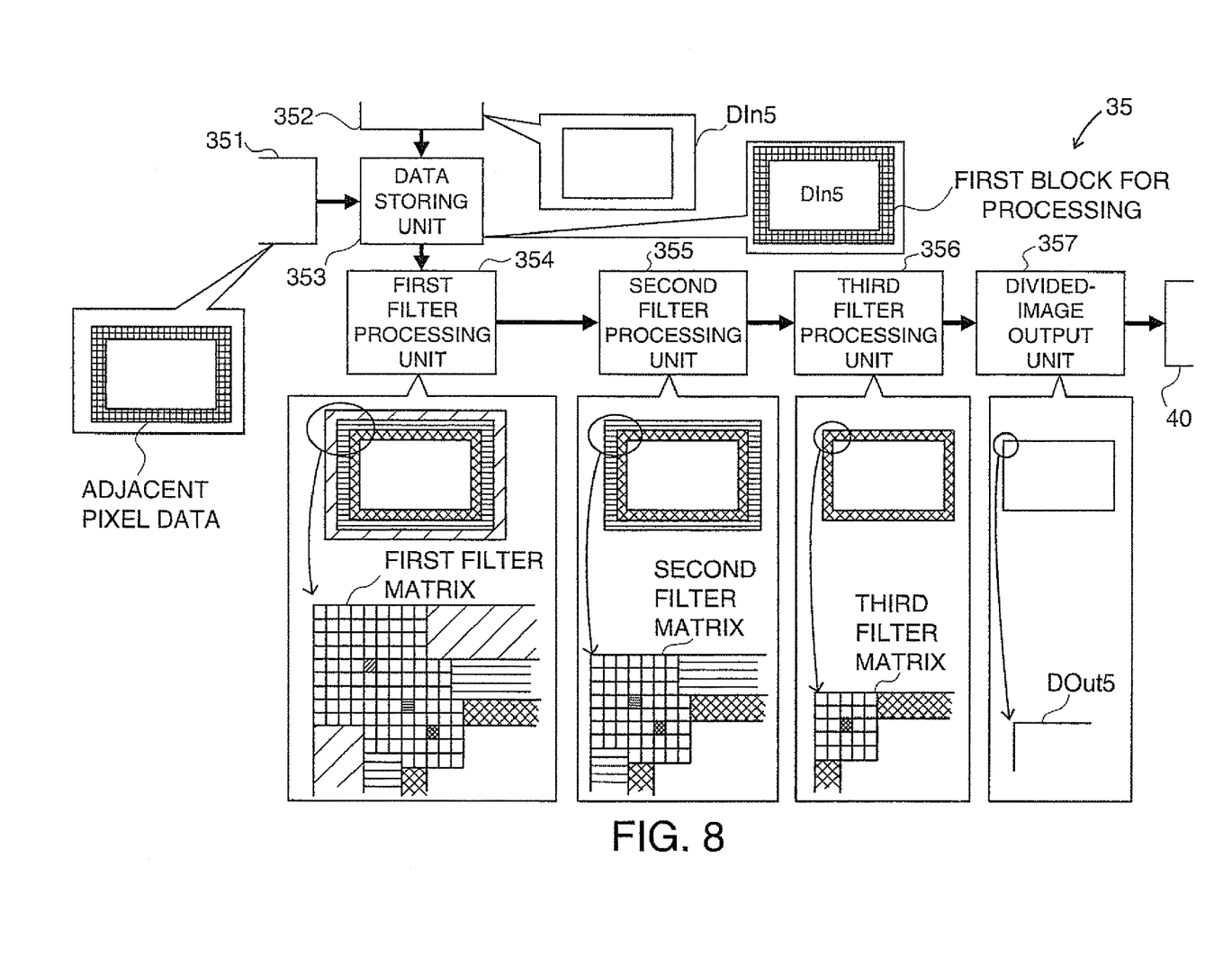
FIG. 8 is a block diagram for explaining filter processing performed by the fifth video processing unit.

FIG. 8 is a block diagram for explaining the filter processing in the video processing performed by the fifth video processing unit 35. As explained above, the data storing unit 353 acquires the image block DIn5 from the divided-image input unit 352, acquires the adjacent pixel data from the data exchanging unit 351, generates the first block for processing, and outputs the first block for processing to the first filter processing unit 354. The first filter processing unit 354 applies the filter processing to the first block for processing using the first filter matrix. As explained above, an area of pixel data processed by the first filter matrix as the first pixel of attention in the first block for processing is an area of pixels used as the second block for processing later. In actual filter processing, a characteristic of pixel data located in the first pixel of attention is detected by the first filter matrix and interpolation of pixels, thinning-out of pixels, a change of a pixel value, and the like are performed. However, for convenience of explanation, explanation of the interpolation of pixels, the thinning-out of pixels, the change of a pixel value, and the like is omitted. When the filter processing applied to the first block for processing ends in the first filter processing unit 354, the first filter processing unit 354 removes, as first invalid pixels, from data after the first filter processing, pixel data other than an area of pixels used by the second filter processing unit as the second block for processing among the pixel data after the processing. In other words, the second block for processing is generated. The removal of invalid pixel data corresponds to a function of a data deleting unit described in claims.

After generating the second block for processing, the first filter processing unit 354 outputs the second block for processing to the second filter processing unit 355. When the second filter processing unit 355 acquires the second block for processing, the second filter processing unit 355 applies the filter processing to the second block for processing using the second filter matrix. As in the processing in the first filter processing unit, an area of pixel data processed by the second filter matrix as the second pixel of attention in the second block for processing is an area of pixels used as the third block for processing later. When the filter processing applied to the second block for processing ends in the second filter processing unit 355, the second filter processing unit 355 removes, as second invalid pixels, from data after the second filter processing, pixel data other than an area of pixels used by the third filter processing unit as the third block for processing among the pixel data after the processing. In other words, the third block for processing is generated.

After generating the third block for processing, the second filter processing unit 355 outputs the third block for processing to the third filter processing unit 356. When the third filter processing unit 356 acquires the third block for processing, the third filter processing unit 356 performs the filter processing in the same manner as the first and second filter processing units. The third filter processing unit 356 removes, as third invalid pixels, from data after the third filter processing and generates the image block DOut5, pixel data other than an area of pixels output to the divided-image output unit 357 as the image block DOut5 among image data after the third filter processing. When the divided-image output unit 357 receives the image block DOut5, the divided-image output unit 357 outputs the image block DOut5 to the video combining unit 40. In this way, the video processing by the fifth video processing unit 35 ends. The video combining unit 40 corresponds to an image combining unit described in claims.

Figure 9:
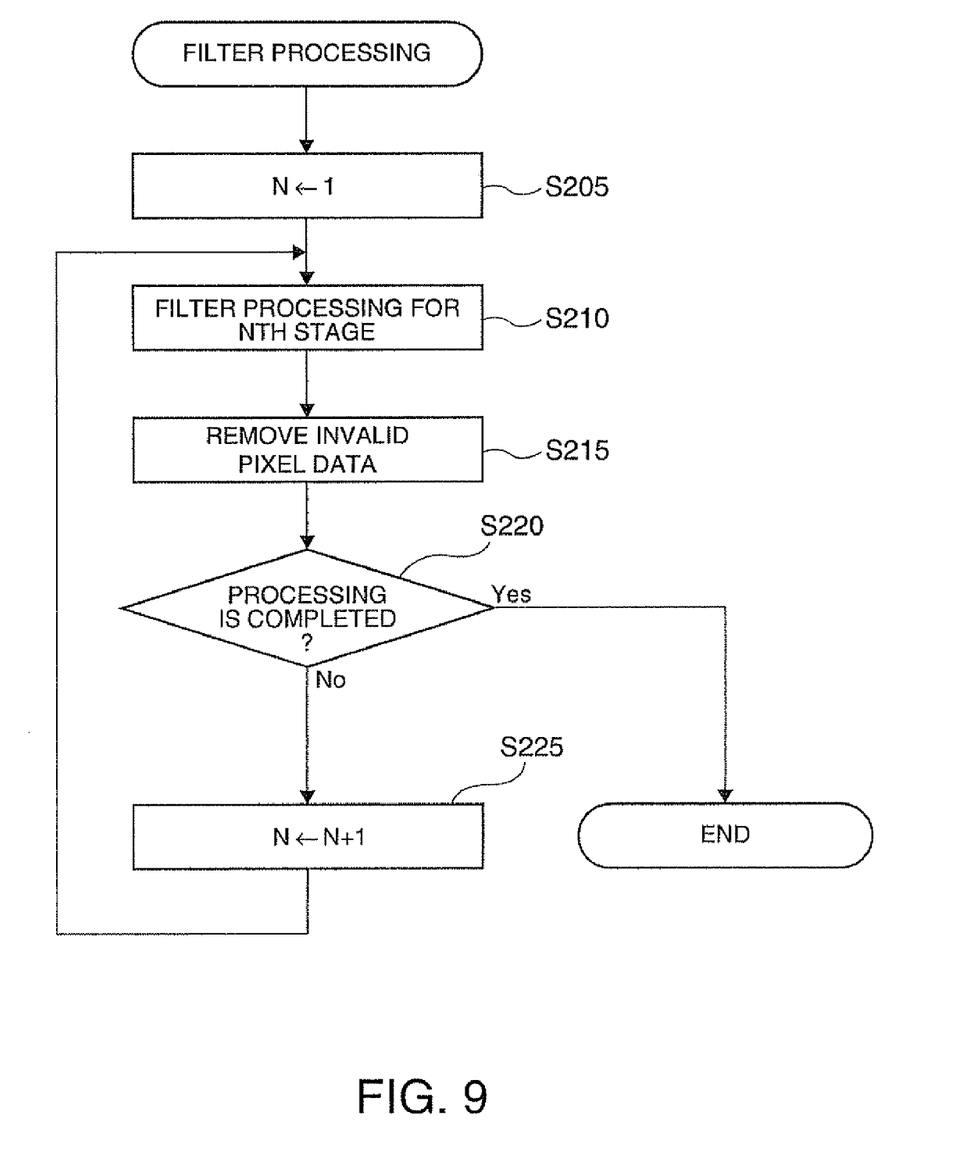
FIG. 9 is a flowchart for explaining a process of the filter processing performed by the fifth video processing unit.

FIG. 9 is a flowchart for explaining a process of the filter processing performed by the fifth video processing unit 35. The flowchart is generalized on the assumption that the fifth video processing unit 35 includes an N-stage filter having N filter processing units. As explained above, the fifth video processing unit 35 performs multistage filter processing in order from filter processing in the first stage (steps S205 and S210). After applying processing to an acquired block for processing in the filter processing unit, the fifth video processing unit 35 removes invalid pixel data unnecessary in the filter processing unit in the next stage (step S215). The fifth video processing unit 35 repeats the processing until all the kinds of filter processing in the N stages are completed (step S225). When all the kinds of filter processing in the N stages are completed (step S220), the fifth video processing unit 35 ends the filter processing.

In the image processing device 1, processing same as the processing explained in the fifth video processing unit 35 is performed in parallel in the video processing units 31 to 39. The image blocks DOut1 to DOut9 output from the video processing units 31 to 39 are combined as a video for one screen by the video combining unit 40 and displayed on a screen of a liquid crystal television via the video output unit 50. In the filter processing for a pixel at an end of the image data DIn forming one screen, since there is no reference pixel that the filter matrix refers to, dummy pixels are provided in the periphery of the end of the image data DIn and used as reference pixels, whereby the filter processing is performed.

As explained above, in the image processing device 1 according to the first embodiment, the image data DIn forming one screen is divided into the nine image blocks DIn1 to DIn9 and the multistage filter processing (the first filter processing, the second filter processing, and the third filter processing) is performed in parallel in the video processing units. The data exchanging units of the video processing units exchange the adjacent pixel data necessary for the filter processing. Therefore, pixels necessary for correctly performing the multistage filter processing are acquired to perform the filter processing. Therefore, it is possible to perform highly accurate filter processing. In the multistage filter processing, after one kind of filter processing, pixel data unnecessary for the following filter processing are removed as invalid pixels. Therefore, it is possible to realize a reduction in a transfer amount of pixel data among the processing units and a reduction in transfer time. Since the filter processing units do not apply the filter processing to unnecessary pixel data, it is possible to improve processing speed.

B. Modifications (B1) First Modification In the first embodiment, the image data DIn is divided into nine. However, the invention is not limited to this. The image data DIn may be divided into an arbitrary number equal to or larger than one as long as the image processing device can process divided image data. Specifically, the image data DIn may be divided into $n^2$ (n is an integer equal to or larger than 2) such as four, nine, and sixteen, divided into an even number such as two, four, and six, or divided into an odd number such as three, five, and seven. Further, the image data DIn may be divided into M×N (M and N are positive integers and at least one of M and N is equal to or larger than 2). For example, when the image data DIn is divided into an odd number, five, the image data DIn can be divided into five in one of the horizontal direction and the vertical direction. When a video signal is input in the horizontal direction, timing for the operation of the processing units and data exchange can be set earlier if the image data DIn is divided in the horizontal direction. In this way, effects same as those in the first embodiment can be obtained.

(B2) Second Modification

In the first embodiment, each of the video processing units includes the three filter processing units (the first, second, and third filter processing units). However, the invention is not limited to this. Each of the video processing units may include filter processing units in multiple stages of an arbitrary number equal to or larger than one as long as the image processing device can process the image data. Specifically, each of the video processing units of the image processing device may include, for example, two, five, or eight filter processing units.

(B3) Third Modification

In the first embodiment, the sizes of the filter matrixes used by the filter processing units are 5 pixels×5 pixels, 7 pixels×7 pixels, and 9 pixels×9 pixels. However, the invention is not limited to this. The filter processing may be performed by using a filter matrix of an arbitrary size.

(B4) Fourth Modification

In the first embodiment, as explained with the fifth video processing unit 35 as the representative example, each of the first to ninth video processing units 31 to 39 includes the data exchanging unit and performs exchange of adjacent pixel data with the video processing unit that handles an image of an area adjacent thereto. On the other hand, in a fourth modification, each of the video processing units 31 to 39 outputs adjacent pixel data to a processing unit (the timing instructing unit 60 in the first embodiment) provided on the outside of the video processing units 31 to 39 and distributes the adjacent pixel data from the timing processing unit 60 to the video processing units 31 to 39. If such a configuration is adopted, it is possible to collectively perform the exchange processing for the adjacent pixel data among the video processing units 31 to 39 and simplify processing contents of the video processing units 31 to 39. In the data exchanged among the adjacent video processing units 31 to 39, since data at corners overlap, it is possible to reduce an amount of data served for the data exchange in the entire video processing units 31 to 39.

(B5) Fifth Modification

Figure 10:
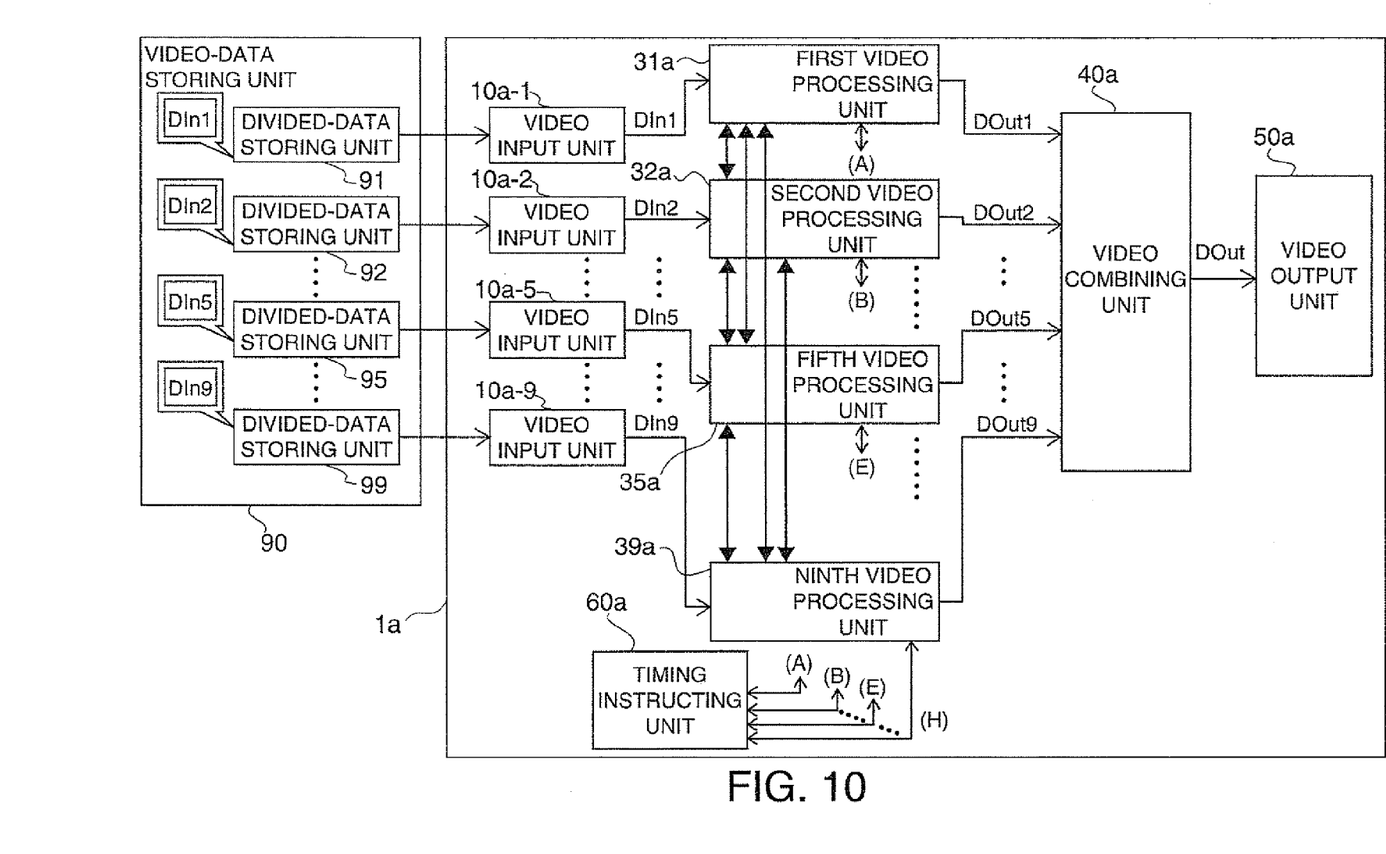
FIG. 10 is a diagram of the configuration of an image processing device in a fifth modification.

FIG. 10 is a diagram for explaining the configuration of an image processing device 1a in a fifth modification. In the first embodiment, the video signal for one frame is input to the video input unit 10 and transmitted to the video dividing unit 20. The video signal is divided into the image blocks DIn1 to DIn9 by the video dividing unit 20. On the other hand, in a fifth modification, video data for one frame is stored in a video-data storing unit 90 connected to the image processing device 1a in a format of the image blocks DIn1 to DIn9, which is a divided data format. Divided-data storing units 91 to 99 indicate storage areas in the video-data storing unit 90 that respectively stores the image blocks DIn1 to DIn9. The image processing device 1a inputs the image blocks DIn1 to DIn9 stored in the divided-data storing units 91 to 99 to first to ninth video processing units 31a to 39a via video input units 10a-1 to 10a-9. A synchronization circuit for synchronizing timing of the input of the image blocks DIn1 to DIn9 to the first to ninth video processing units 31a to 39a may be provided. Processing of the image blocks DIn1 to DIn9 after the input to the first to ninth video processing units 31a to 39a, i.e., processing in video processing units, a video combining unit, and a video output unit is the same as the processing in the first embodiment. In this way, in the fifth modification, video processing is applied to the originally divided image blocks DIn1 to DIn9 by the video processing units. Therefore, it is possible to omit the processing for dividing the video data for one frame and obtain effects same as those in the first embodiment. As the video-data storing unit 90, storage devices and storage media that can store video data such as a HDD (hard disk drive), a SDD (silicon disk drive), a CD, a DVD, and a Blu-ray disc can be used.

The entire disclosure of Japanese Patent Application NO. 2009-090094, filed Apr. 2, 2009 is expressly incorporated by reference herein.

What is claimed is:

1. A video processing device that processes video data representing a video for one screen, the video processing device comprising:
   an input unit that receives input of the video data;
   plural image processing units that are provided to correspond to respective plural areas obtained by dividing the video data, receive image data corresponding to the areas, and apply predetermined image processing to image data;
   an image-data extending unit that acquires image data, which is required by an image processing unit of the image processing units that processes an area adjacent to each of the areas, prior to the image processing by each of the image processing units from the image data corresponding to the area received by each of the image processing units, inputs the image data to an adjacent image processing unit of the image processing units, extends the image data corresponding to the area received by each of the image processing units, and sets the image data as a target of the predetermined image processing by each of the image processing units; wherein
   the image processing unit includes a plurality of filter processing units arrayed in series such that the filter processing is performed in order,
   each of the filter processing units includes a data deleting unit that outputs, to the filter processing unit in the next stage arrayed in series, image data after the filter processing by each of the filter processing unit and from which image data in a peripheral area, to which the filter processing cannot be applied, is deleted, and
   an image combining unit that receives the image data processed by the plural image processing units and reconfigures the screen.

2. The video processing device according to claim 1, further comprising an image dividing unit that divides the input video data for each of the plural areas and outputs the video data as image data for each of the areas, wherein
   the image processing units are provided to correspond to each of the divided plural areas, receive the image data corresponding to the area and apply the predetermined image processing to the image data.

3. The video processing device according to claim 1, wherein the image-data extending unit is provided for each of the image processing units.

4. The video processing device according to claim 1, wherein
   the image processing unit includes a filter processing unit that performs filter processing targeting a predetermined number of pixels, and
   the image-data extending unit acquires image data necessary for the filter processing from another image processing unit that processes the area adjacent to the area processed by the image processing unit.

5. The video processing device according to claim 1, wherein the image-data extending unit acquires, from the other image processing unit, image data in an area corresponding to a sum of image data deleted according to the filter processing performed by the plural filter processing units.

6. The video processing device according to claim 2, wherein the image dividing unit divides the video data into image data corresponding to M×N (M and N are positive integers and at least one of M and N is equal to or larger than 2) areas.

7. A video display device comprising:
   the video processing device according to claim 1; and
   a video display unit displays the video based on the video data processed by the video processing device.

8. A video processing method for processing a video data for one screen using plural image processing units that apply predetermined image processing to the video data, the video processing method comprising:
   receiving input of data of the video;
   dividing the input video data for each of the plural areas and outputting the video data as image data for each of the areas;
   acquiring image data, which is required by an image processing unit of the image processing units that processes an area adjacent to each of the areas, prior to the image processing by each of the plural image processing units from the image data corresponding to the area received by each of the image processing units, inputting the image data to an adjacent image processing unit of the image processing units, and extending the image data corresponding to the area received by each of the image processing units, wherein
   the image processing unit includes a plurality of filter processing units arrayed in series such that the filter processing is performed in order,
   each of the filter processing units includes a data deleting unit that outputs, to the filter processing unit in the next stage arrayed in series, image data after the filter processing by each of the filter processing unit and from which image data in a peripheral area, to which the filter processing cannot be applied, is deleted;
   applying the predetermined image processing to the extended image data using the plural image processing units; and
   receiving the image data processed by the plural image processing units and reconfiguring the screen.

* * * * *